United States Patent
Dunn (10) Patent No.: US 11,411,460 B2
(45) Date of Patent: Aug. 9, 2022

(54) ELECTRIC MACHINE ASSEMBLY AND METHOD TO ASSEMBLE

(71) Applicant: Ford Global Technologies, LLC, Dearborn, MI (US)

(72) Inventor: Casey Taylor Dunn, Brownstown, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 678 days.

(21) Appl. No.: 16/242,136

(22) Filed: Jan. 8, 2019

(65) Prior Publication Data

US 2020/0220436 A1 Jul. 9, 2020

(51) Int. Cl.
| | |
|---|---|
| *H02K 3/50* | (2006.01) |
| *H02K 3/52* | (2006.01) |
| *H02K 5/22* | (2006.01) |
| *H01R 9/16* | (2006.01) |
| H02K 15/00 | (2006.01) |
| H02K 3/32 | (2006.01) |
| H02K 3/28 | (2006.01) |

(52) U.S. Cl.
CPC .............. *H02K 5/225* (2013.01); *H01R 9/16* (2013.01); *H02K 3/50* (2013.01); *H02K 3/52* (2013.01); *H02K 3/28* (2013.01); *H02K 3/32* (2013.01); *H02K 15/0068* (2013.01)

(58) Field of Classification Search
CPC ...... H02K 15/0068; H02K 5/225; H02K 3/28; H02K 3/32; H02K 3/50; H02K 3/52; H02K 3/521; H02K 15/0025; H02K 15/0043; H02K 15/028; H01R 9/16; H01R 2201/10

USPC .................................................... 310/71, 416
See application file for complete search history.

(56) References Cited

U.S. PATENT DOCUMENTS

| | | |
|---|---|---|
| 4,127,934 A | 12/1978 | Bartley et al. |
| 7,542,267 B2 | 6/2009 | Ishijima |
| 10,193,409 B2* | 1/2019 | Nakayama ............. H02K 15/02 |
| 2009/0315419 A1 | 12/2009 | Mita et al. |
| 2015/0017845 A1* | 1/2015 | Tomita .................... H01R 4/186 439/879 |
| 2017/0110929 A1* | 4/2017 | Egami ..................... H02K 5/225 |
| 2021/0344243 A1* | 11/2021 | Koga ................. H02K 15/0081 |

* cited by examiner

*Primary Examiner* — Quyen P Leung
*Assistant Examiner* — Alexander A Singh
(74) *Attorney, Agent, or Firm* — David B Kelley; Brooks Kushman P.C.

(57) ABSTRACT

An electric machine assembly including a terminal assembly and three terminal lugs is provided. The terminal assembly may include three pairs of terminal leads. Each of the three terminal luges may define a pair of terminal lead throughholes and a pair of opposing radial sides. Each terminal lug may be compressed at one of the sides to deform a respective terminal lug and secure each of the pair of terminal leads within one of the pair of terminal lead through-holes. The assembly may further include a stator disposed within a housing and include end windings. Each of the terminal leads may include a base terminal portion. The terminal assembly and the stator may be arranged with one another such that each base terminal portion is aligned with one of the end windings for securing thereto. The assembly may further include three bridges.

11 Claims, 8 Drawing Sheets

ELECTRIC MACHINE ASSEMBLY AND METHOD TO ASSEMBLE

TECHNICAL FIELD

The present disclosure relates to a structure of an electric machine assembly and a method to assemble the same.

BACKGROUND

Complex geometries of components of electric machines drive burdensome assembly processes. A stator of the electric machine assembly includes terminals to connect electrical windings with a high-voltage terminal assembly. The terminal assembly sends current to each phase of the electric machine as directed by an inverter system controller. A connection to the terminal assembly includes a component having a connection to terminal leads along with a location to engage a fastener. Current stator designs may utilize terminal leads of a same material as the electrical winding, such as a rectangular magnet wire. Utilizing the magnet wire for the terminal leads and the electrical winding may provide a simpler design, however the resulting manufacturing complexity may outweigh any benefits obtained by the simpler design.

SUMMARY

An electric machine assembly includes a terminal assembly and three terminal lugs. The terminal assembly includes three pairs of terminal leads. Each of the three terminal luges defines a pair of terminal lead through-holes and a pair of opposing radial sides. Each terminal lug is compressed at one of the sides to deform a respective terminal lug and secure each of the pair of terminal leads within one of the pair of terminal lead through-holes. The assembly may further include a stator disposed within a housing and include end windings. Each of the terminal leads may include a base terminal portion. The terminal assembly and the stator may be arranged with one another such that each base terminal portion is aligned with one of the end windings for securing thereto. The assembly may further include three bridges. Each bridge may be oriented to secure an end of each of the three pairs of terminal leads to a respective end winding. Each of the base terminal portions may be shaped such that each of the three bridges is circumferentially oriented relative to a stator central axis. Each of the three terminal lugs may be compressed via a coining operation. The assembly may further include three fasteners and a transmission housing. Each of the three terminal lugs may further define a fastener through-hole spaced from a respective one of the pair of terminal lead through-holes and each of the three fasteners may extend through one of the fastener through-holes to secure the terminal assembly to the transmission housing. Each terminal lug may further define a fastener hole to receive a fastener to secure each terminal lug to a transmission housing such that clearance is provided between each terminal lead and the transmission housing. The assembly may further include a stator defining a central axis and including at least six end windings. Each of the at least six end windings may include a first connection end for securing to one of the three pairs of terminal leads. Each terminal lead of the three pairs of terminal leads may include at least one bend portion and a second connection end. Each of the at least one bend portions may be structured to align each of the second connection ends in a circumferential orientation relative to the central axis of the stator.

An electric machine assembly includes a stator, end windings, and a terminal assembly. The stator is disposed within a housing. The end windings extend from the stator and each includes a first connection end. The terminal assembly includes three pairs of terminal leads and three terminal lugs. Each terminal lug corresponds to one of the three pairs of terminal leads, each terminal lug includes a first receiving aperture sized to receive one of the three pairs of terminal leads, each of the terminal leads of the three pairs of terminal leads includes a second connection end, and each of the terminal lugs is arranged with the stator to align each of the second connection ends for joining with one of the first connection ends. Each terminal lug may further include a second receiving aperture sized to receive one of the terminal leads of the three pairs of terminal leads. Each of the terminal lugs may be compressed to retain a respective pair of terminal leads within a respective first receiving aperture. Each of the terminal leads of the three pairs of terminal leads may further include at least two bend portions. The terminal assembly may further include a terminal block secured to each of the three terminal lugs. Each of the at least two bend portions may be shaped such that clearance is provided between the stator and a transmission housing and shaped such that each of the second connection ends is circumferentially oriented relative to a stator central axis. Each terminal lead of the three pairs of terminal leads may define at least a first bend portion shaped to position each of the second connection ends of the terminal leads in a circumferential orientation relative to a stator central axis. Each of the at least a first bend portions may be further shaped to provide clearance between a transmission housing supporting the terminal assembly and the stator. The assembly may further include three bridges. Each bridge may correspond to one of the three pairs of terminal leads to further connect respective first and second connection ends. Each of the terminal leads of the three pairs of terminal leads may further include at least two bend portions. Each of the at least two bend portions may be shaped such that bridges connecting the first and second connection ends are circumferentially oriented relative to a stator central axis.

A method for assembling an electric machine assembly includes aligning a first end of each terminal lead of three terminal lead pairs with each of a first end of end windings of a stator for a joining operation; inserting a second end of each terminal lead within one of a pair of lug apertures of only three lugs; and executing a coining operation to compress opposing sides of each lug of the only three lugs such that each lug is deformed to capture one of each respective second end of the three terminal lead pairs within one of the lug apertures to complete an electrical connection between each of the three terminal lead pairs and a respective lug of the only three lugs. The method may further include joining each of the first ends of each terminal lead of the three terminal lead pairs with a respective first end of the stator end windings. The method may further include arranging each of the three terminal lead pairs with the stator such that a fastener aperture of each of the only three lugs is arranged with a transmission housing such that each of three fasteners may extend through a respective fastener aperture to secure each of the only three lugs to the transmission housing. The method may further include forming each of the terminal leads of the three terminal lead pairs to define a first bend portion such that a clearance is provided between a transmission housing supporting the only three lugs and the stator. The method may further include bending a wire portion of each of the three terminal lead pairs such that the first ends of each terminal lead are arranged in a circumferential orientation relative to the stator. The coining operation may include a single tool to grasp and compress each of the terminal lugs of the only three terminal lugs.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
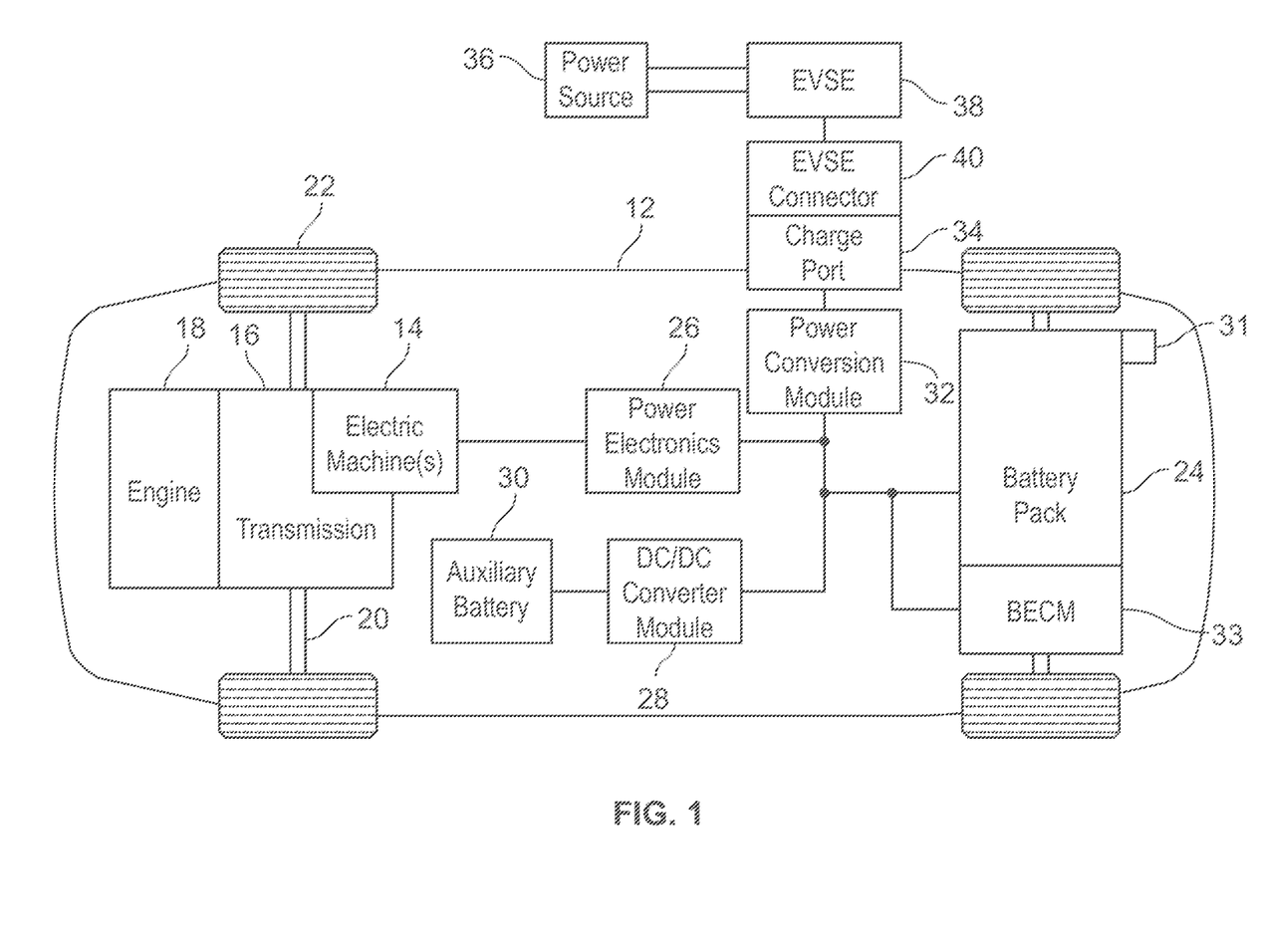
FIG. 1 is a schematic diagram illustrating an example of an electrified vehicle.

FIG. 1 illustrates a schematic representation of an example of an electrified vehicle. In this example, the electrified vehicle is a plug-in hybrid electric vehicle (PHEV) referred to as a vehicle 12 herein. The vehicle 12 may include one or more electric machines 14 mechanically connected to a hybrid transmission 16. Each of the electric machines 14 may be capable of operating as a motor or a generator and may include a stator and a terminal block assembly. In addition, the hybrid transmission 16 is mechanically connected to an engine 18. The hybrid transmission 16 is also mechanically connected to a drive shaft 20 that is mechanically connected to wheels 22. The electric machines 14 may provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 stores energy that can be used by the electric machines 14. The traction battery 24 typically provides a high-voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to the other components when closed.

The power electronics module 26 is also electrically connected to the electric machines 14 and provides an ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14.

In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high-voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12.

The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

Figure 2:
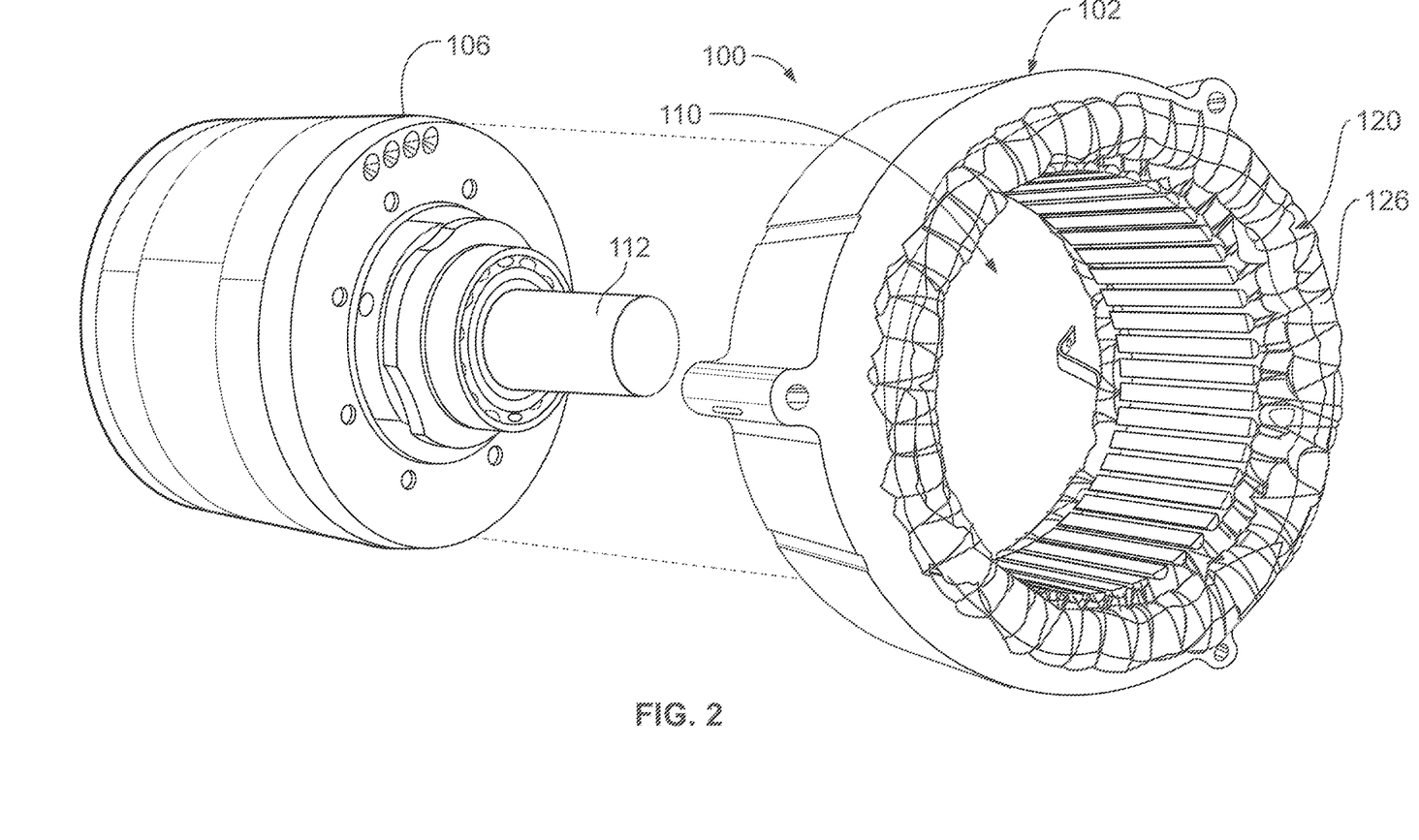
FIG. 2 is a perspective, partially exploded view of an example of a portion of a vehicle electric machine assembly.

FIG. 2 is a partially exploded view illustrating an example of portions of an electric machine assembly for an electrified vehicle, referred to generally as an electric machine 100 herein. The electric machine 100 may include a stator core 102 and a rotor 106. The stator core 102 may define a cavity 110. The rotor 106 may be sized for disposal and operation within the cavity 110. A shaft 112 may be operably connected to the rotor 106 and may be coupled to other vehicle components to transfer mechanical power therefrom.

Electrical windings 120 may be disposed within the cavity 110 of the stator core 102. In an electric machine motor example, current may be fed to the electrical windings 120 to obtain a rotational force on the rotor 106. In an electric machine generator example, current generated in the electrical windings 120 by a rotation of the rotor 106 may be used to power vehicle components. Portions of the electrical windings 120, such as end windings 126, may extend from the cavity 110. During operation of the electric machine 100, heat may be generated along the electrical windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field such that magnets of the rotor 106 will magnetize and rotate with the rotating magnetic field to rotate the shaft 112 for mechanical power.

Figure 3A:
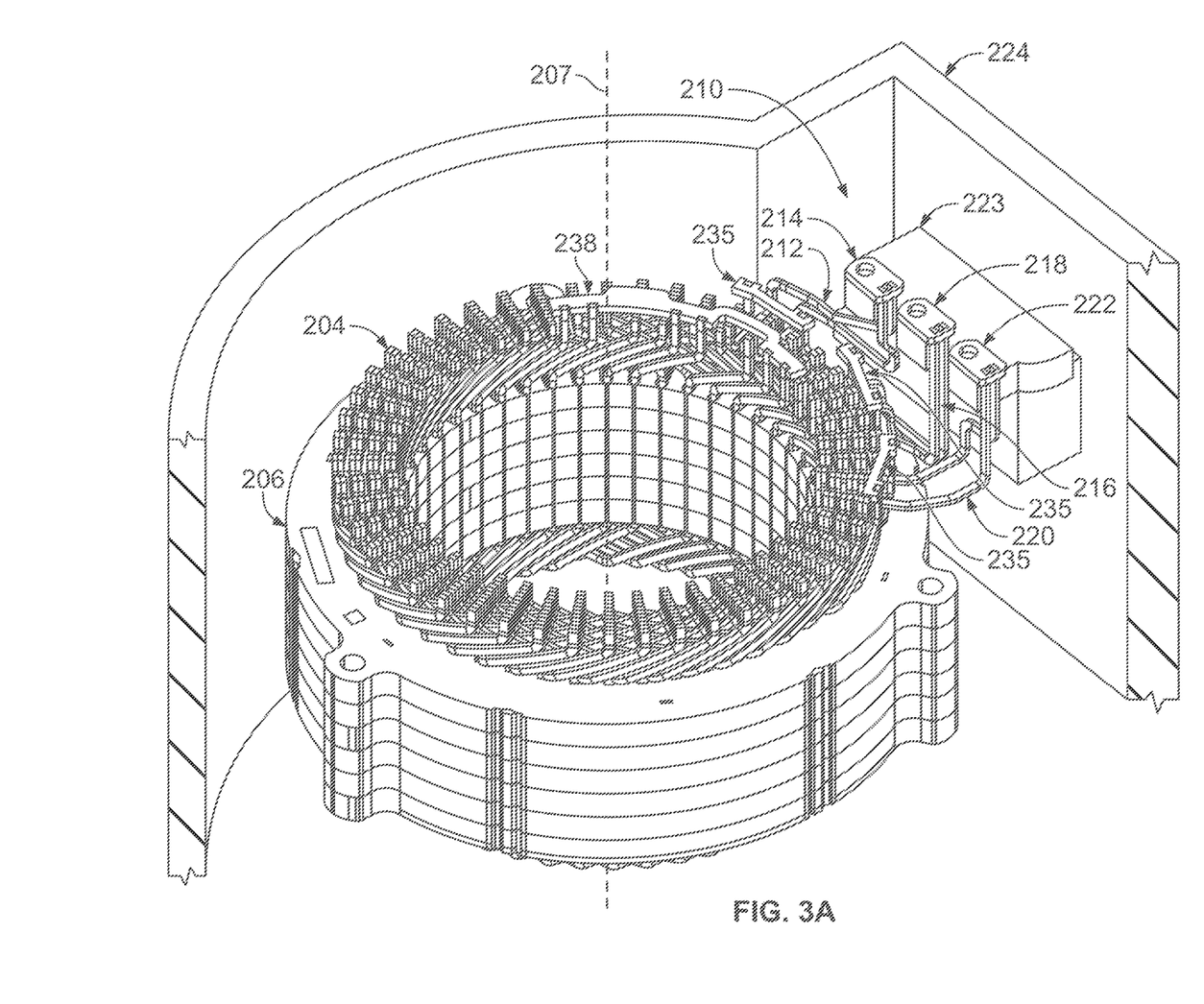
FIG. 3A is a perspective view illustrating an example of a portion of an electric machine assembly.
Figure 4:
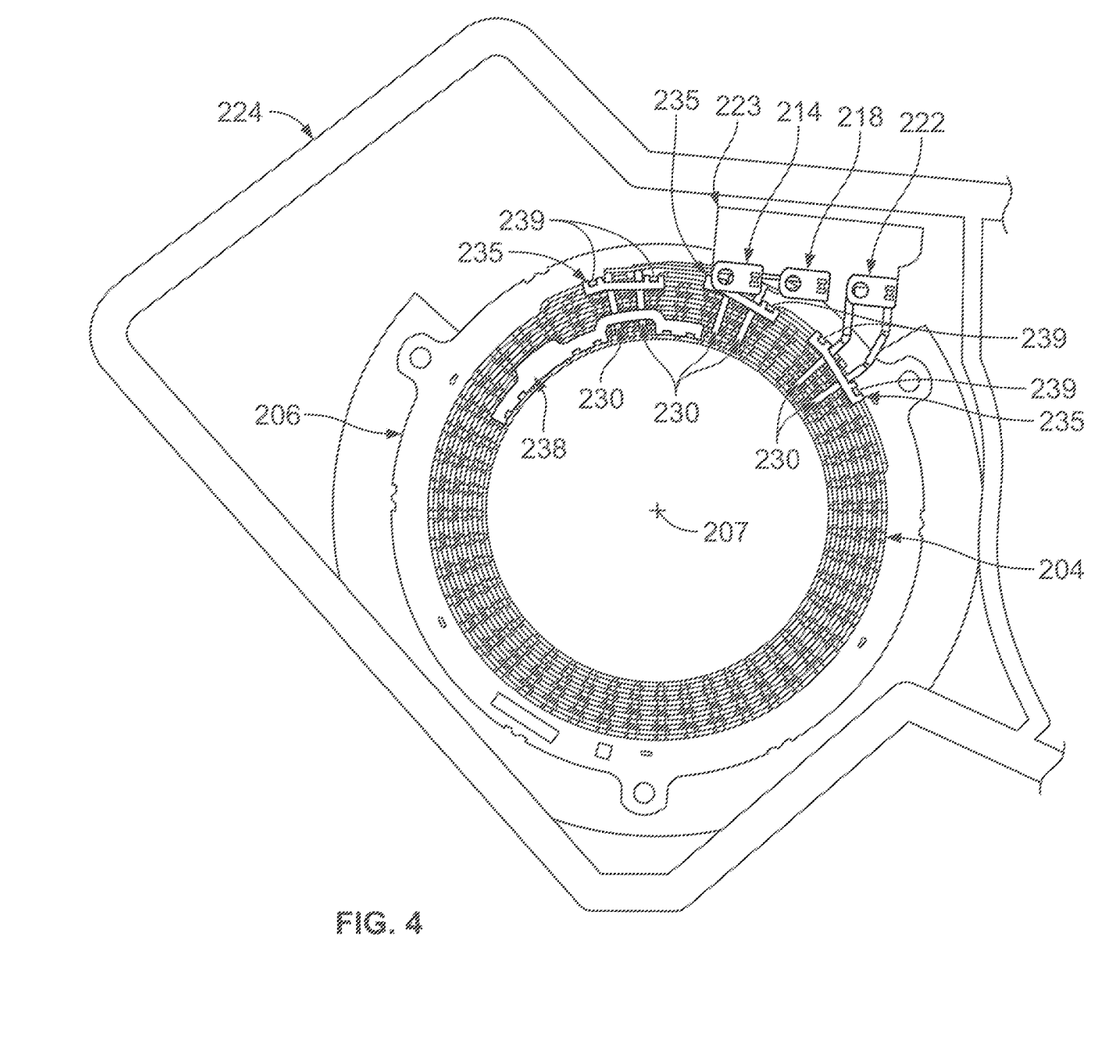
FIG. 4 is a top plan view of the portion of the electric machine of FIG. 3.

FIGS. 3A and 4 illustrate an example of a portion of an electric machine assembly, referred to generally as an electric machine assembly 200 herein. The electric machine assembly 200 may include a plurality of electrical windings 204 disposed within a housing 206. The electrical windings 204 and the housing 206 may form a portion of a stator assembly. The housing 206 defines a central axis 207. The electric machine assembly 200 may further include terminals and terminal assemblies to assist in facilitating operation of the electric machine assembly 200.

For example, a terminal assembly 210 may assist in connecting the electrical windings 204 of the electric machine assembly 200 to other vehicle components. The terminal assembly 210 may send current to each phase of the electric machine assembly 200 as directed by an inverter system controller (not shown in FIGS. 3A and 4). Each wire of a plurality of wire pairs may include a connection end for joining with an end of one of the plurality of electrical windings 204 or with one of three jumper bridges (further described below) and an insertion end for securing to a terminal lug. For example, the terminal assembly 210 may include a first wire pair 212, a first lug 214, a second wire pair 216, a second lug 218, a third wire pair 220, and a third lug 222. It is contemplated that the terminal assembly 210 may have more than three or less than three wire pairs and respective lugs based on a desired phase of a particular electric machine assembly. In this example, each wire of the wire pairs may define a rectangular cross-section though it is contemplated that other cross-sectional shapes are available.

Figure 3B:
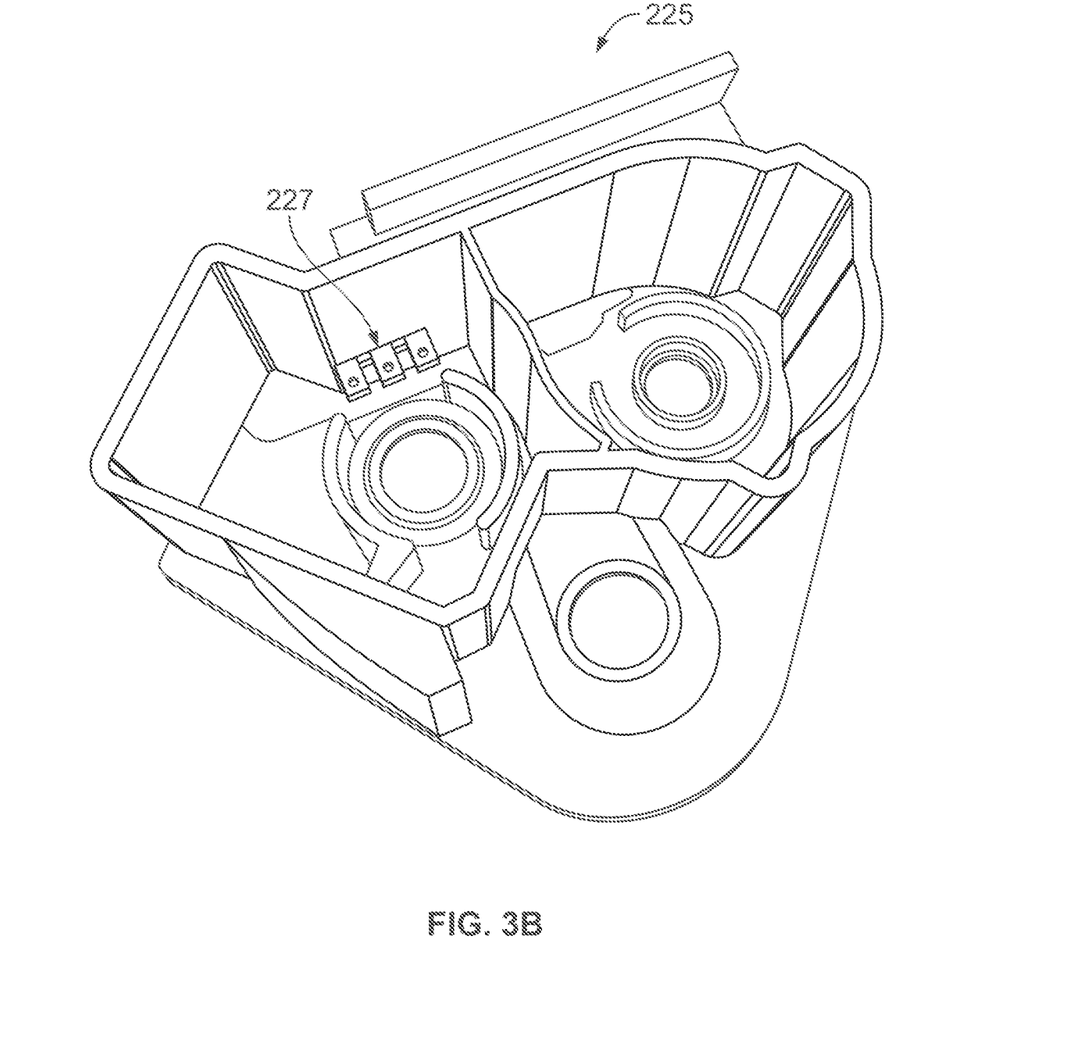
FIG. 3B is a perspective view illustrating an example of a transmission housing.

The first lug 214, the second lug 218, and the third lug 222 may each be secured to a terminal block 223. Each of the lugs may define one or more through-holes sized to receive one or more of the insertion ends of each wire of the plurality of wire pairs as further described herein. The terminal block 223 may be secured to an adjacent vehicle component, such as a transmission housing 224. The terminal block 223 and the transmission housing 224 may be arranged with one another such that each of the plurality of wire pairs and respective terminal lugs are disposed within the transmission housing 224. FIG. 3B shows an example of a transmission housing that may operate with the electric machine assembly 200, referred to generally as a transmission housing 225 herein. In this example, portions of a terminal assembly 227 are shown extending through an opening in the transmission housing 225 such that wire pairs of the terminal assembly would be disposed within the transmission housing 225 as well.

Figure 5:
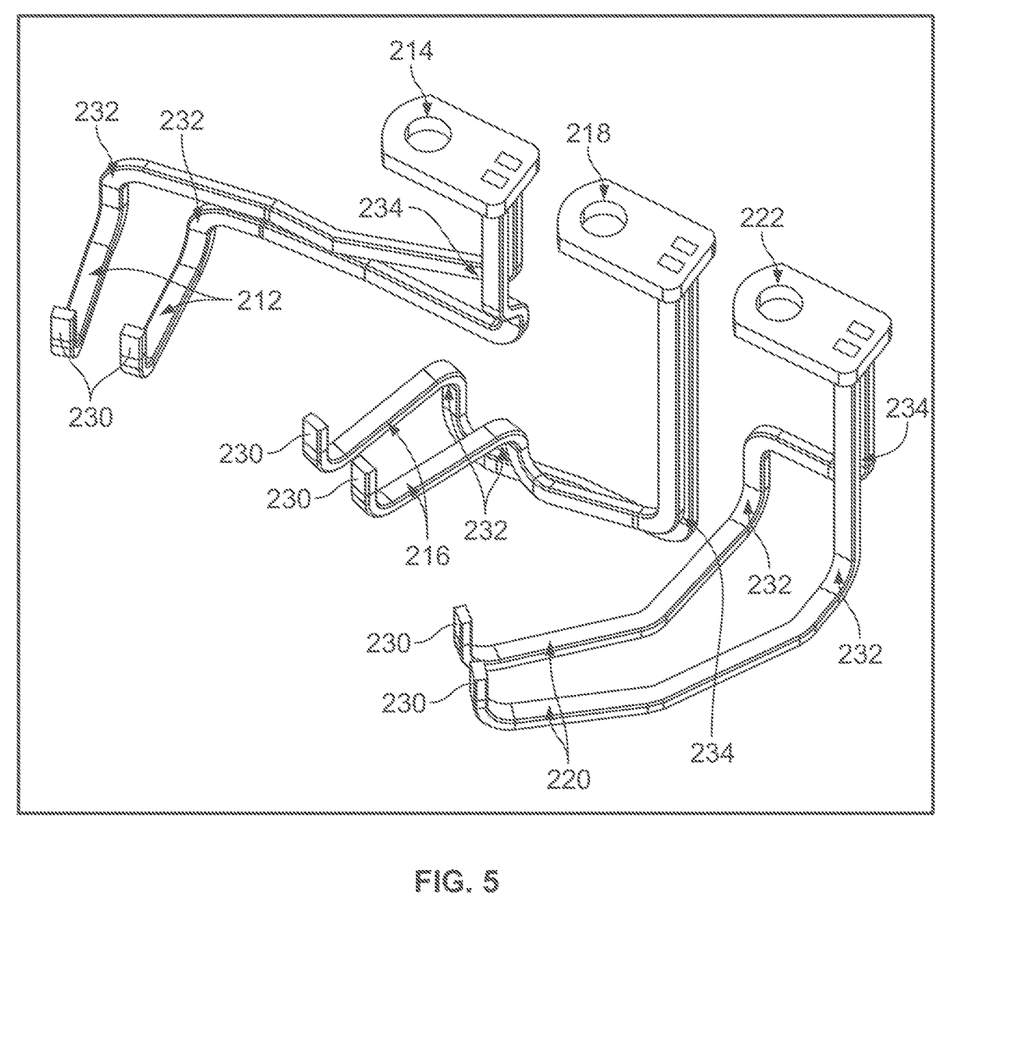
FIG. 5 is a perspective view illustrating an example of a portion of a terminal assembly of the electric machine of FIG. 3.

FIG. 5 illustrates further detail of the terminal assembly 210. Each of the first wire pair 212, the second wire pair 216, and the third wire pair 220 may be shaped to facilitate optimal performance of the electric machine assembly 200. For example, each wire of the first wire pair 212, the second wire pair 216, and the third wire pair 220 may include a terminal lead 230, a first bend portion 232, and a second bend portion 324. Each of the terminal leads 230 may include a connection end to join with a respective electrical winding 204 or respective bridge. The bend portions may be shaped and arranged with one another to align respective terminal leads in a circumferential orientation relative to the central axis 207 for electrical connection to respective electrical windings 204 (the circumferential orientation is best shown in FIGS. 3A and 4).

The electric machine assembly 200 may include electrical bridges to assist in facilitating the electrical connection between each wire of the plurality of wire pairs and the respective winding of the electrical windings 204. For example, the electric machine assembly 200 may include three jumper bridges 235 and a neutral bridge 238. Each of the jumper bridges 235 may be oriented to electrically connect the respective terminal lead 230 to the respective electrical winding 204 and such that each of the bridges 235 is circumferentially oriented relative to the central axis 207. The neutral bridge 238 may be oriented to electrically connect phases from the terminal assembly 210 to the electrical windings 204. In one example, each of the jumper bridges 235 may electrically combine two phases from a respective wire pair into one phase. Each of the jumper bridges 235 may then be connected to a terminal lead 239 to transfer the phases to the electrical windings 204. In another example, each wire of the plurality of wire pairs may be electrically connected directly to the respective electrical winding 204 without a jumper bridge.

Each of the terminal leads 230 may connect with one of the electrical windings 204, via either a direct connection or bridge connection, of the electric machine assembly 200 to facilitate electrical communication between the electrical windings 204 and the terminal assembly 210. Each of the first bend portions 232 and each of the second bend portions 324 may be shaped to provide clearance for vehicle components, such as a transmission housing, located adjacent the electric machine assembly 200.

Each of the first bend portions 232 may be shaped to arrange a portion of a respective wire for radial alignment relative to the central axis 207 and to arrange another portion of a respective wire for substantially parallel alignment with an upper surface of the housing 206 for joining a respective connection end of each of the terminal leads 230 with one of the electrical windings 204. Each of the second bend portions 324 may be shaped to position a respective first bend portion for the radial and parallel alignments described above.

Figure 6A:
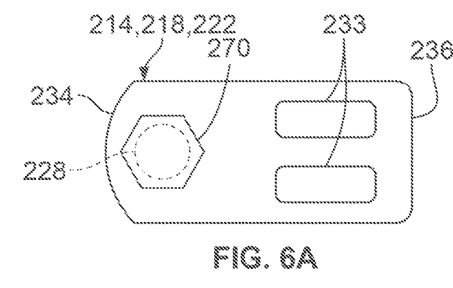
FIG. 6A is a detailed, top plan view of an example of a lug of the terminal assembly of FIG. 5 shown in a first configuration.
Figure 6B:
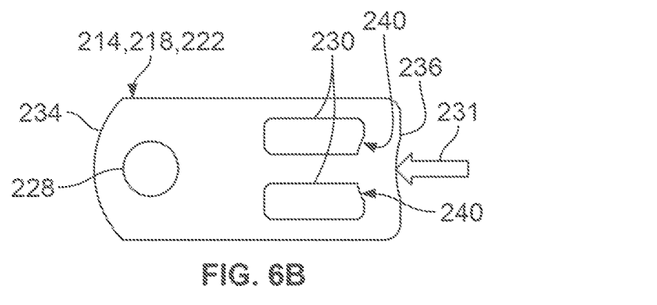
FIG. 6B is a detailed, top plan view of the lug of FIG. 6A shown in a second configuration.

FIGS. 6A and 6B illustrate further detail of examples of lugs of the terminal assembly 210. For example, FIGS. 6A and 6B illustrate detailed views of a terminal lug, such as the first lug 214, the second lug 218, or the third lug 222. Each of the terminal lugs may define a first opening 228 sized to receive a fastener 270. The fasteners may assist in securing the terminal assembly 210 to the terminal block 223 and the transmission housing 224.

Each of the terminal lugs may define a pair of second openings 233. Each of the pair of second openings 233 may be sized to receive a portion of one end of one wire of each of the wire pairs. The second openings 233 may be sized such that a compression force appropriately applied to a respective lug joins a respective wire with a respective terminal lug when a portion of the respective wire is inserted within one of the second opening 233. In FIGS. 6A and 6B, the compression force is represented by force arrow 237. Each lug may include a first radial side 234 and a second radial side 236. In this example, the second radial side 236 receives the compression force represented by force arrow 237 and deforms the terminal lug at deformation portions 240 as shown in FIG. 6B. The deformation translates to an outer portion of each of the second openings 233 such that the respective lug joins with the respective wire disposed with the respective second openings 233. The deformation may be, for example, created via a coining process.

Figure 6C:
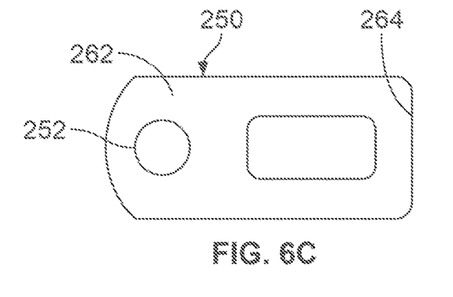
FIG. 6C is a detailed, top plan view of another example of a lug for the terminal assembly of FIG. 5 shown in a first configuration.
Figure 6D:
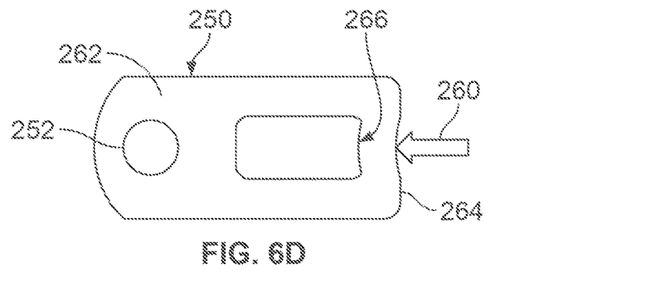
FIG. 6D is a detailed, top plan view of the lug of FIG. 6C shown in a second configuration.

FIGS. 6C and 6D illustrate another example of a terminal lug for use with the terminal assembly 210, referred to generally as a terminal lug 250 herein. The terminal lug 250 may be used with the terminal assembly 210. The terminal lug 250 may define a first opening 252 sized to receive a fastener to assist in securing the terminal assembly 210 to the terminal block 223 and the transmission housing 224.

The terminal lug 250 may define a second opening 258. The second opening 258 may be sized to receive a portion of two wires from a respective wire pair. The second opening 258 may be sized such that a compression force appropriately applied to a respective terminal lug joins the respective wire pair with the respective terminal lug when a portion of the respective wire pair is inserted within the second opening 258. In FIGS. 6C and 6D, the compression force is represented by force arrow 260. The terminal lug 250 may include a first radial side 262 and a second radial side 264. In this example, the second radial side 264 receives the compression force represented by force arrow 260 and deforms at deformation portions 266 as shown in FIG. 6D. The deformation translates to the second opening 258 such that the terminal lug 250 engages portions of the respective wires disposed therein. The deformation may be, for example, created via a coining process.

Figure 7A:
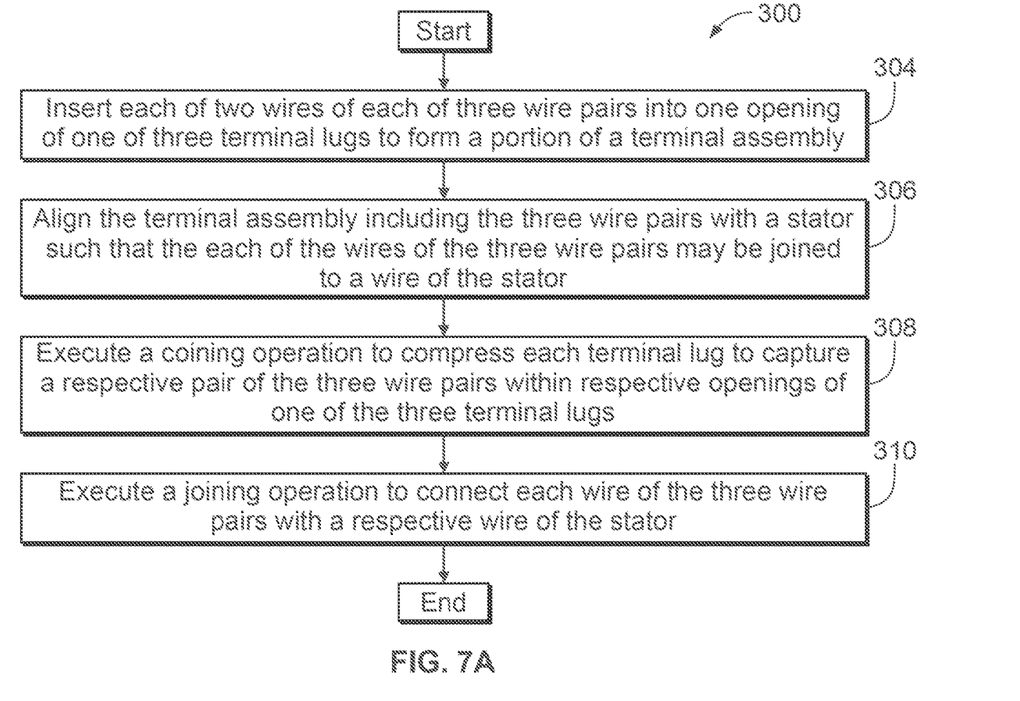
FIG. 7A is a flow chart illustrating an example of an assembly process of a component for an electric machine assembly.
Figure 7B:
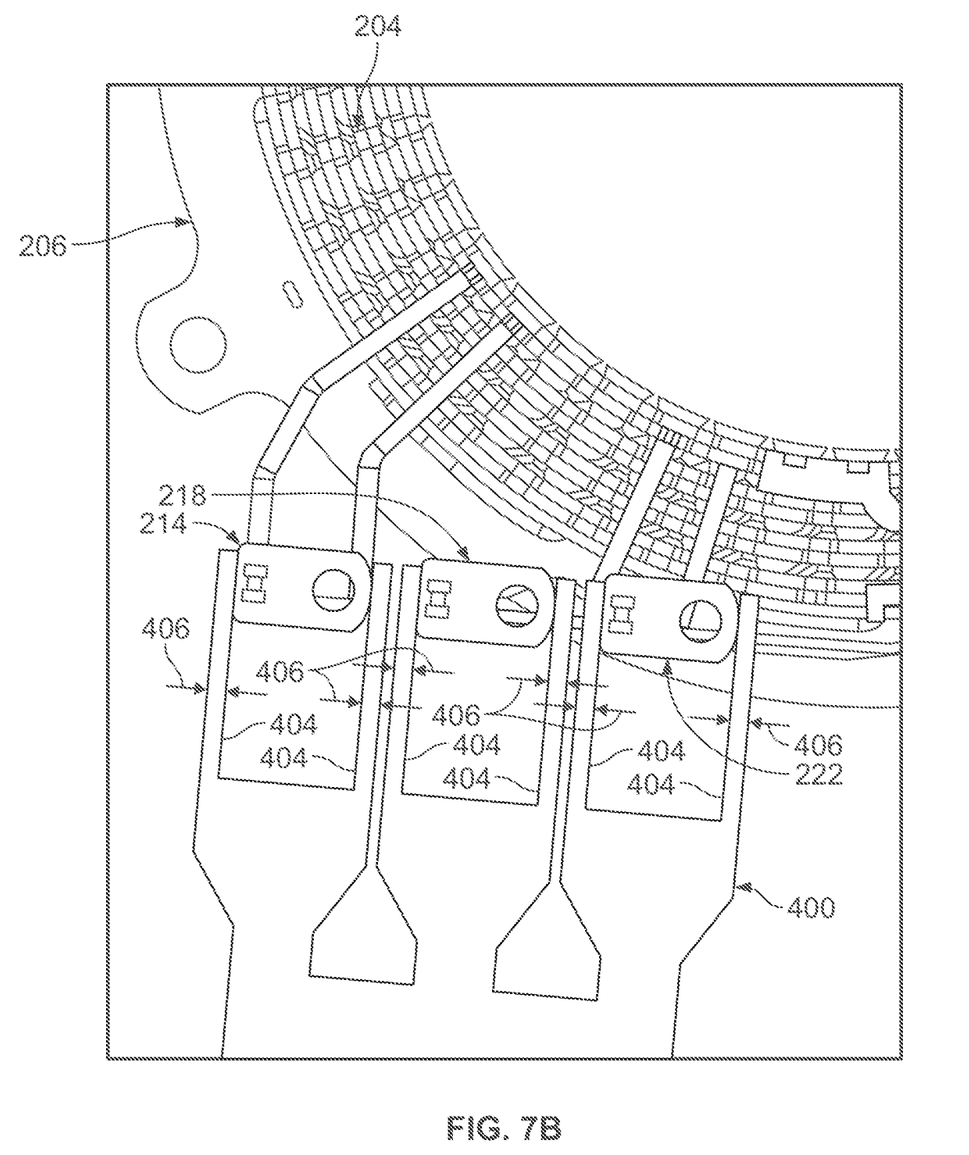
FIG. 7B is a top plan view illustrating a portion of the assembly process of FIG. 7A.

FIGS. 7A and 7B illustrate an example of a method to assemble a portion of an electric machine assembly, referred to generally as a method 300 herein. The method 300 provides assembly improvements in comparison to previous methods by, as one example, minimizing an amount of required fixturing to electrically connect a terminal assembly to electrical wires of a stator assembly. For example, previous methods may require an operator to handle six or more uniquely formed wires and retain the six or more wires in place while terminal lugs are secured to one end of one of the six or more wires while the other ends of the six or more wires is fixed in place in preparation for a weld process. Due to a complexity of the previous methods, additional weld operations may be needed in comparison to the method 300. The previous methods may also require more cycle time in comparison to the method 300. The method 300 only requires a fixturing of three wire pairs and requires fewer weld operations in comparison to previous methods.

In operation 304, first ends of two wires of each of three wire pairs may be inserted into a respective opening defined by a respective terminal lug to form a portion of a terminal assembly. This portion of the terminal assembly may include only three terminal lugs and the three wire pairs. In one example, an operator may form several of the portions of the terminal assembly for use in the subsequent operation of the method 300.

In operation 306, an operator may align second ends of each wire of the three wire pairs with end windings of wires of a stator for joining to facilitate electrical conduction. An example of the terminal assembly includes the terminal assembly 210 having the first wire pair 212, the second wire pair 216, and the third wire pair 220. Each wire of the three wire pairs may include a terminal lead for connecting with one of the three terminal lugs. Each wire of the three wire pairs may include bend portions, such as the first bend portions 232 and the second bend portions 324, to facilitate proper alignment with the wires of the stator.

Each of the bend portions may be shaped to facilitate alignment of the second ends of each wire of the three wire pairs in a circumferential orientation relative to a stator central axis. Each of the bend portions may be further shaped such that a clearance is provided between the terminal assembly and an adjacent vehicle component, such as a transmission housing. Each terminal lead may also be arranged with the stator assembly so that a fastener aperture of each of the three terminal lugs is arranged with the adjacent vehicle component such that one fastener of a plurality of fasteners may extend through a respective fastener aperture to secure each of the three terminal lugs to the adjacent vehicle component.

In operation 308, a coining operation may compress each of the terminal lugs from radial sides such that a respective terminal lug is deformed and captures a respective wire pair within a respective terminal lug opening. For example and now referring additionally to FIG. 7B, a portion of a tool 400, a portion of the electrical windings 204, and a portion of the housing 206 is shown. The tool 400 may include three extensions, each extension including a pair of translatable arms 404. Each of the pairs of translatable arms 404 may translate between at least a first position and a second position as represented by arrows 406. In the first position, each of the pairs of translatable arms 404 may be spaced from one or both respective radial sides of a respective terminal lug. In the second position, each of the pairs of translatable arms 404 may contact the respective radial sides to compress the respective terminal lug therebetween. This compression may deform the respective terminal lug to capture a respective wire within the respective lug opening.

In operation 310, a joining operation, such as welding, may be executed to connect each wire of the three wire pairs with a respective end winding extending from the stator. A joining operation may also be executed to further the respective wire within the respective lug opening.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine assembly comprising:
    a terminal assembly including three pairs of terminal leads;
    three terminal lugs each defining a pair of terminal lead through-holes and a pair of opposing radial sides, wherein each terminal lug is compressed at one of the sides to deform a respective terminal lug and secure each of the pair of terminal leads within one of the pair of terminal lead through-holes;
    a stator disposed within a housing and including end windings, wherein each terminal lead of the three pairs of terminal leads includes a base terminal portion, and wherein the terminal assembly and the stator are arranged with one another such that each base terminal portion is aligned with one of the end windings for securing thereto; and
    three bridges, each bridge oriented to secure an end of each of the three pairs of terminal leads to a respective end winding, wherein each of the base terminal portions is shaped such that each of the three bridges is circumferentially oriented relative to a stator central axis.

2. The assembly of claim 1, wherein each of the three terminal lugs is compressed via a coining operation.

3. The assembly of claim 1 further comprising three fasteners and a transmission housing, wherein each of the three terminal lugs further defines a fastener through-hole spaced from a respective one of the pair of terminal lead through-holes and each of the three fasteners extends through one of the fastener through-holes to secure the terminal assembly to the transmission housing.

4. The assembly of claim 1, wherein each terminal lug further defines a fastener hole to receive a fastener to secure each terminal lug to a transmission housing such that clearance is provided between each of the three pairs of terminal leads and the transmission housing.

5. The assembly of claim 1 further comprising a stator defining a central axis and including at least six end windings, each of the at least six end windings including a first connection end for securing to one of the three pairs of terminal leads, wherein each terminal lead of the three pairs of terminal leads comprises at least one bend portion and a second connection end, and wherein each of the at least one bend portions is structured to align each of the second connection ends in a circumferential orientation relative to the central axis of the stator.

6. An electric machine assembly comprising:
    a stator disposed within a housing;
    end windings extending from the stator and each including a first connection end;
    a terminal assembly including three pairs of terminal leads and three terminal lugs, wherein each of the three terminal lugs corresponds to one of the three pairs of terminal leads, each of the three terminal lugs includes a first receiving aperture sized to receive one of the three pairs of terminal leads, each of the terminal leads of the three pairs of terminal leads includes a second connection end, and each of the three terminal lugs is arranged with the stator to align each of the second connection ends for joining with one of the first connection ends; and
    three bridges, each bridge corresponding to one of the three pairs of terminal leads to further connect respective first and second connection ends, wherein each of the terminal leads of the three pairs of terminal leads further includes at least two bend portions, and the bend portions are shaped such that bridges connecting the first and second connection ends are circumferentially oriented relative to a stator central axis.

7. The assembly of claim 6, wherein each of the three terminal lugs further includes a second receiving aperture sized to receive one of the terminal leads of the three pairs of terminal leads.

8. The assembly of claim 6, wherein each of the three terminal lugs is compressed to retain a respective pair of terminal leads of the three pairs of terminal leads within a respective first receiving aperture.

9. The assembly of claim 6, wherein each of the terminal leads of the three pairs of terminal leads further includes at least two bend portions, wherein the terminal assembly further includes a terminal block secured to each of the three terminal lugs, and wherein each of the at least two bend portions is shaped such that clearance is provided between the stator and a transmission housing and shaped such that each of the second connection ends is circumferentially oriented relative to a stator central axis.

10. The assembly of claim 6, wherein each terminal lead of the three pairs of terminal leads defines at least a first bend portion shaped to position each of the second connection ends of the terminal leads of the three pairs of terminal leads in a circumferential orientation relative to a stator central axis.

11. The assembly of claim 10, wherein each of the at least a first bend portion is further shaped to provide clearance between a transmission housing supporting the terminal assembly and the stator.

* * * * *